United States Patent
Dequarti

(10) Patent No.: US 9,927,259 B2
(45) Date of Patent: Mar. 27, 2018

(54) ROTARY POSITION INDICATOR FOR ACTUATOR

(71) Applicant: Cameron International Corporation, Houston, TX (US)

(72) Inventor: Alberto Dequarti, Mede (IT)

(73) Assignee: Cameron International Corporation, Houston, TX (US)

(*) Notice: Subject to any disclaimer, the term of this patent is extended or adjusted under 35 U.S.C. 154(b) by 406 days.

(21) Appl. No.: 14/598,531

(22) Filed: Jan. 16, 2015

(65) Prior Publication Data
US 2015/0226580 A1     Aug. 13, 2015

(30) Foreign Application Priority Data
Feb. 7, 2014   (EP) .................................... 14154286

(51) Int. Cl.
| G01D 5/26 | (2006.01) |
| G01D 5/14 | (2006.01) |
| F16K 37/00 | (2006.01) |
| F16K 31/122 | (2006.01) |

(52) U.S. Cl.
CPC ......... *G01D 5/142* (2013.01); *F16K 31/1225* (2013.01); *F16K 37/0008* (2013.01); *F16K 37/0016* (2013.01); *G01D 5/26* (2013.01)

(58) Field of Classification Search
USPC ................ 137/47, 48, 154–156; 324/207.24, 324/207.11
See application file for complete search history.

(56) References Cited

U.S. PATENT DOCUMENTS

| 5,176,164 A * | 1/1993 | Boyle .................... E21B 34/06 137/155 |
| 2004/0053743 A1* | 3/2004 | Tsuzuki ................ F16H 59/105 477/97 |
| 2010/0063353 A1* | 3/2010 | Eliachar ............. A61B 17/2909 600/106 |
| 2011/0232405 A1 | 9/2011 | Morin et al. |
| 2013/0043420 A1 | 2/2013 | Case et al. |
| 2013/0200212 A1* | 8/2013 | Lecourtier .............. B64C 19/00 244/99.3 |

FOREIGN PATENT DOCUMENTS

| DE | 2744720 A1 | 4/1979 |
| GB | 452596 A | 8/1936 |
| GB | 2147689 A | 5/1985 |

OTHER PUBLICATIONS

Extended European Search Report for EP Application No. 14154286, dated Jul. 7, 2014.
International Search Report & Written Opinion for PCT Application No. PCT/US2015/014526 dated Apr. 20, 2015, 10 pages.

* cited by examiner

*Primary Examiner* — Vincent Q Nguyen
(74) *Attorney, Agent, or Firm* — Fletcher Yoder, P.C.

(57) ABSTRACT

A rotary position indicator is configured to integrate with an actuator, wherein the rotary position indicator includes a first shaft and a second shaft in a nested arrangement, wherein the first and second shafts are configured to transfer linear motion of an actuation component of the actuator into a first rotational motion and a gear box configured to couple to the actuator, wherein the gear box is configured to transfer the first rotational motion to a second rotational motion of a position shaft.

15 Claims, 4 Drawing Sheets

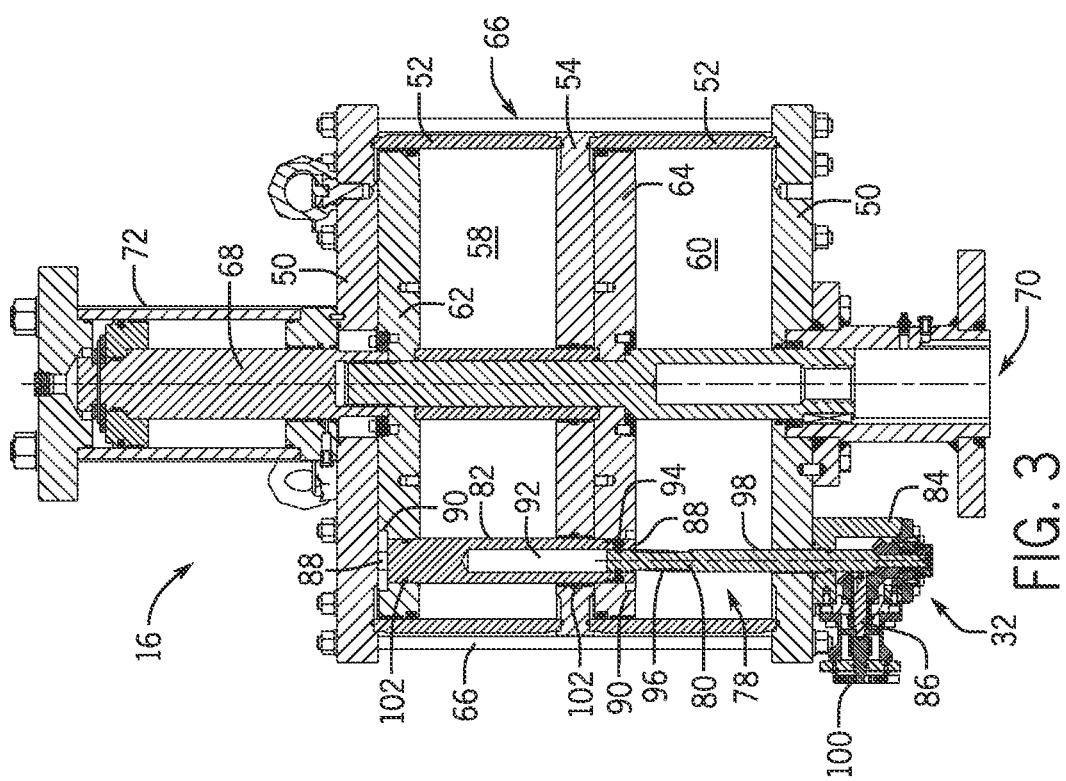
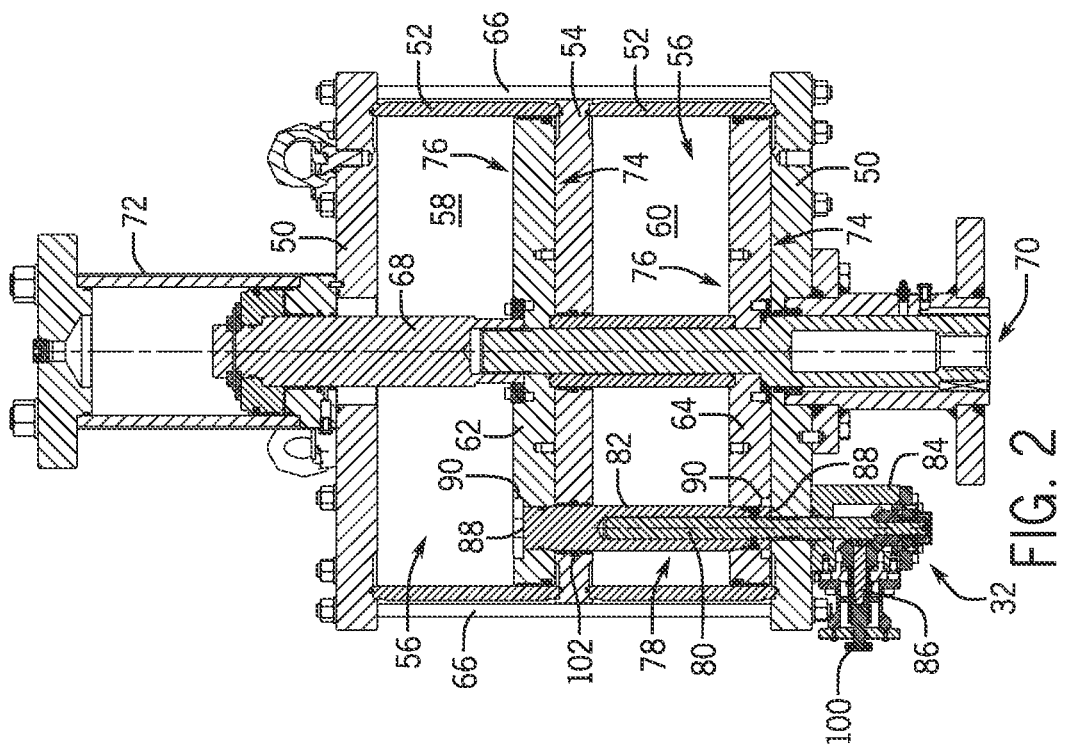
FIG. 2
FIG. 3

ROTARY POSITION INDICATOR FOR ACTUATOR

CROSS REFERENCE TO RELATED APPLICATION

This application claims priority from and the benefit of European Patent Application Serial No. EP14154286, entitled "ROTARY POSITION INDICATOR FOR ACTUATOR," filed Feb. 7, 2014, which is hereby incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas are fluids that have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

The flow of fluid, whether petroleum-based or otherwise, can be controlled with valves. Fluid flows through a valve in an open configuration, but that flow can be interrupted by transitioning the valve to a closed configuration. While many valves are manually actuated between the open and closed configurations, more-robust valves found in industrial settings may be actuated mechanically by a hydraulic, electric, or pneumatic actuator, for example.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 2 is a cross-sectional view of the actuator having the rotary position indicator in a closed position, in accordance with embodiments of the present disclosure;

FIG. 3 is a cross-sectional view of the actuator having the rotary position indicator in an open position, in accordance with embodiments of the present disclosure;

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following disclosure relates to a rotary position indicator for an actuator, such as a linear valve actuator. More specifically, the disclosed embodiments include a rotary position indicator configured to provide a visual indication of a valve actuated by the actuator. For example, the actuator may be a cylinder actuator, a spring actuator, a hydraulic actuator, a pneumatic actuator, a motorized actuator, other type of actuator, or any combination thereof configured to actuate a valve, such as a ball valve, gate valve, plug valve, butterfly valve, or other type of valve. As the actuator actuates the valve, the rotary position indicator, which is engaged with the actuator, also actuates to provide an accurate indication of the position of the valve. For example, the rotary position indicator may be configured to provide an indication that the valve is in an open position, a closed position, or any position therebetween. Furthermore, the rotary position indicator may be fully enclosed and sealed within a housing that is integrated with the actuator. As such, the disclosed embodiments may be robust and without external moving parts to improve accuracy and repeatability of operation.

Figure 1:
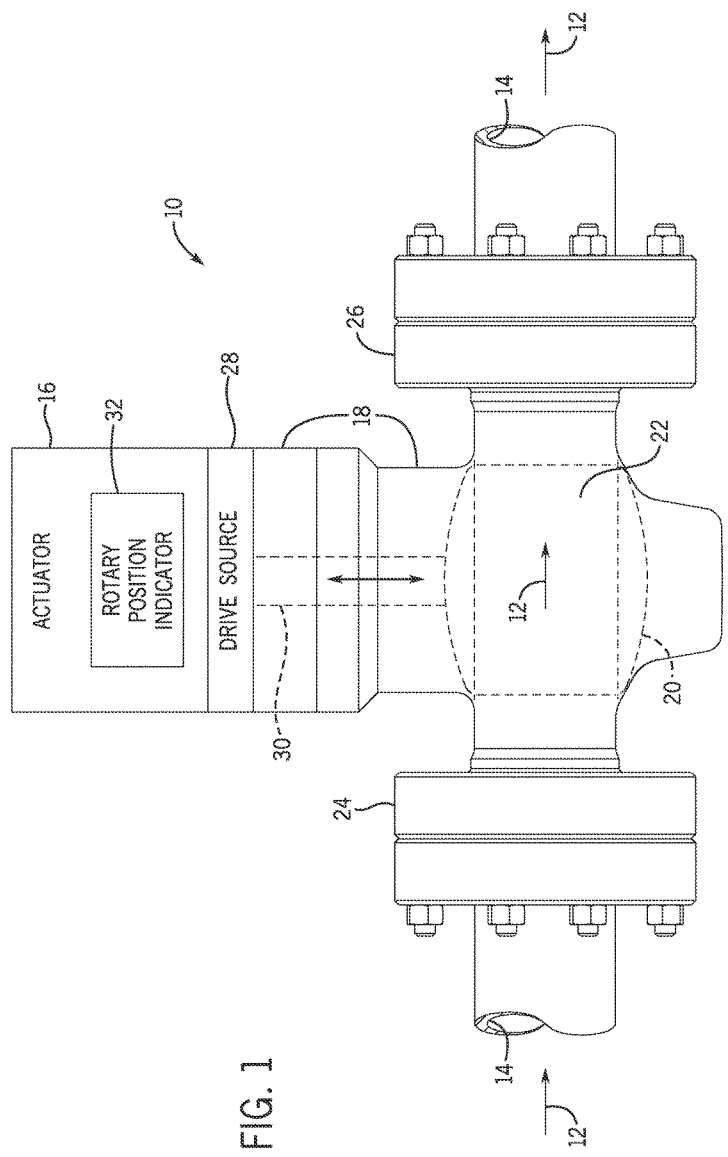
FIG. 1 is a diagrammatic illustration of a valve assembly having an actuator with a rotary position indicator, in accordance with an embodiment of the present disclosure.

FIG. 1 is a diagrammatic illustration of a valve assembly 10 for controlling a flow 12 of a fluid through a flow path 14. The valve assembly 10 includes an actuator 16 (e.g., a linear actuator) that is coupled to a valve body 18. The valve body may support any number of valve types, examples of which are butterfly valves, ball valves, quarter-turn valves, gate valves, to name but a few. As illustrated, the valve body 18 carries a ball valve 20. In the open configuration, a through bore 22 of the ball valve 20 is aligned with an inlet 24 and an outlet 26 of the valve assembly 10. This allows the flow 12 to pass through the valve. The flow 12 can be interrupted by turning the ball valve 20 to place the through bore 22 perpendicular to the inlet 24 and outlet 26. In other words, rotating the ball valve 20 transitions the valve assembly 10 between closed and open configurations. The valve assembly 10 is generally configured to control a flow of fluid through the valve assembly 10 in various applications. For example, the valve assembly 10 may be employed in applications relating to oil and gas industries (e.g., subsea and/or surface applications), petrochemical industries, and the like. In certain embodiments, the valve assembly 10 may be coupled to a Christmas tree for petroleum and natural gas extraction.

To effectuate this quarter-turn of the ball valve 20, the actuator 16 provides a motive force through a drive source 28 (e.g., an actuation component). The drive source 28 may be one of any number of suitable devices, such as an hydraulic actuator, an electric and linear motor, a pneumatic device, a spring return actuator, or a manual wheel, to name a few. In the illustrated embodiment, the drive source 28 is coupled to a valve stem 30 attached to the ball valve 20. In operation, the drive source 28 may apply a linear force to the valve stem 30. The valve stem 30 may have a force transfer component, such two shafts having a spiral interface that converts the linear force to a rotational force. As a result, the linear force on the valve stem 30 is transferred to a rotational force on the ball valve 20. Accordingly, the drive source 28 can be used to rotate the ball valve 20 and transition the valve assembly 10 between the open and closed configurations to control the flow 12 through the flow path 14. The valve assembly 10 may be used in an on/off manner to allow or restrict flow from upstream components to downstream components along the flow path 14.

As described in detail below, the actuator 16 may include a rotary position indicator 32, which provides an indication of the position of the actuator 16, and thus the ball valve 20. More specifically, the rotary position indicator 32 may be in a housing integrated with the actuator 16 and may be fully enclosed to reduce external components of the rotary position indicator 32. As a result, the operation of the rotary position indicator 32 may provide increased accuracy and repeatability. Furthermore, the rotary position indicator 32 may be preloaded (e.g., with a spring) to enable a reduction in recoil, backlash, or other undesired movement of the rotary position indicator 32, which may otherwise inaccurately reflect the true position of the actuator 16 and ball valve 20. In other words, the rotary position indicator 32 may be configured to actuate congruently and/or proportionally with the actuator 16 to provide an accurate and continuous indication of the position of the actuator 16 and ball valve 20.

The discussion below describes the rotary position indicator 32 in an embodiment where the actuator 16 is a hydraulic actuator. However, in other embodiments, the rotary position indicator 32 may be incorporated with other actuators 16, such as spring return actuator, a pneumatic actuator, an electric actuator, or other type of actuator. Similarly, the valve assembly 10 in FIG. 1 includes the ball valve 20, although the valve assembly 10 could include a quarter-turn ball valve, gate valve, a plug, a butterfly valve, or other type of valve in other embodiments. Furthermore, it should be appreciated that the valve assembly 10 may have other configurations and/or components, and the terms "inlet", "outlet," "upstream," and "downstream" are used for ease of reference and are not intended to limit the valve assembly 10 to any specific directional configuration. Moreover, the use of the adjectival or adverbial modifiers "horizontal" and "vertical," "upwardly" and "downwardly," or "clockwise" and "counter-clockwise" are also only used for ease of relative reference between the sets of terms and are not intended to limit the valve assembly 10 to any specific directional configuration.

FIG. 2 is a cross-sectional view of an embodiment of the actuator 16 having the rotary position indicator 32 in a closed position. In the illustrated embodiment, the actuator 16 includes cylinder end flanges 50 disposed on opposite, axial ends of a cylinder liner 52. Additionally, the actuator 16 includes an intermediate flange 54 disposed at an axial midpoint of the cylinder liner 52, which thereby defines two piston chambers 56 (e.g., a first piston chamber 58 and a second piston chamber 60) within the cylinder liner 52. Each piston chamber 56 includes a respective piston (e.g., actuation component) disposed therein. Specifically, the first piston chamber 58 includes a first piston 62, and the second piston chamber 60 includes a second piston 64. The cylinder end flanges 50 are coupled to one another by bolts 66, enabling the cylinder end flanges 50 to capture the cylinder liner 62 and the intermediate flange 54 with the first and second pistons 62 and 64 enclosed within the first and second piston chambers 58 and 60, respectively.

The first and second pistons 62 and 64 are each secured to a piston rod 68 that extends through a center of the first and second pistons 62 and 64, the first and second piston chambers 58 and 60 and the cylinder end flanges 50. Further, an end 70 of the piston rod 68 may be coupled to the stem 30 of the ball valve 20 via threads or other mechanical coupling feature. Upon actuation of the actuator 16, the piston rod 70 may translate upward into a hydraulic damping cylinder 72 of the actuator 16. More specifically, a compressed gas may be supplied into the first and second piston chambers 58 and 60 (e.g., on first sides 74 of the pistons 62 and 64) to force the pistons 62 and 64 and the piston rod 68 upwards. As will be appreciated, the inclusion of two pistons within the actuator 16 may increase (e.g., double) the actuation force of the actuator 16. As the piston rod 70 is actuated upwards, the stem 30, and thus the ball valve 20, may be translated upwards, thereby moving the ball valve 20 into a closed position. To move the ball valve 20 back towards the open position, compressed gas may be similarly supplied into the first and second piston chambers 58 and 60 on second sides 76 of the pistons 62 and 64 to force the pistons 62 and 64 and the piston rod 70 downward.

As discussed above, the actuator 16 and the ball valve 20 is operated by forcing the pistons 62 and 64 upward and downward within the piston chambers 58 and 60, respectively. As a result, the rotary position indicator 32 engages with the pistons 62 and 64 to provide feedback regarding the position of the actuator 16 and the ball valve 20 (e.g., the range of movement between open and closed positions). In other words, the position of the pistons 62 and 64 is measured or monitored by the rotary position indicator 32 and communicated to a user or operator.

As shown, the rotary position indicator 32 includes an indicator tube 78 having an inner shaft 80 and an outer shaft 82 in a nested arrangement. That is, the outer shaft 82 is disposed about the inner shaft 80 and is coupled to the first and second pistons 62 and 64. Additionally, the inner shaft 80 extends through one of the cylinder end flanges 50 and into a gear box 84 of the rotary position indicator 32. In the manner described below, axial linear movement of the pistons 62 and 64 is transferred to linear movement of the outer shaft 82, which is then transferred into rotational movement of the inner shaft 80. Thereafter, the rotational movement of the inner shaft 80 is transferred through the gear box 84 to rotational movement of a position shaft 86 of the rotary position indicator 32.

As mentioned above, the outer shaft 82 is coupled to the first and second pistons 62 and 64. More specifically, the outer shaft 82 may be engaged with the first and second pistons 62 and 64, such that the outer shaft 82 moves linearly with and is fixed between the first and second pistons 62 and 64 but does not rotate relative to the first and second pistons 62 and 64. For example, axial ends 88 of the outer shaft 82 may have notches or other geometries that engage with similar geometries of respective apertures or recesses 90 of the first and second pistons 62 and 64. In this manner, the outer shaft 82 is captured between the first and second pistons 62 and 64 and moves linearly or axially with the first and second pistons 62 and 64 during actuation of the actuator 16. As mentioned above, FIG. 2 illustrates the actuator 16 in a closed position, with the first and second pistons 62 and 64 and the outer shaft 82 lowered within the actuator 16. On the other hand, FIG. 3 illustrates the actuator 16 in an opened position. As such, the first and second pistons 62 and 64 and the outer shaft 82 are in a raised position within the actuator 16. Nevertheless, between the closed and opened positions, the first and second pistons 62 and 64 and the outer shaft 82 remain in fixed positions relative to one another.

As shown in FIGS. 2 and 3, the inner shaft 80 extends axially into a central cavity 92 of the outer shaft 82. As the outer shaft 82 moves linearly with the first and second pistons 62 and 64, linear movement of the outer shaft 82 is transferred to rotational movement of the inner shaft 80. More specifically, the outer shaft 82 includes a plurality of pins 94 that engage with respective slots (e.g., spiral slots or helical slots) 96 formed on an outer surface 98 of the inner shaft 80. In other embodiments, the inner shaft 80 and/or outer shaft 82 may have other spiraling interfaces to enable transfer of linear motion to rotational motion.

When the outer shaft 82 coupled to the first and second pistons 62 and 64 is linearly translated up and down, the pins 94, which remain fixed to the outer shaft 82 (e.g., without rotating), slide along and within the respective helical slots 96 of the inner shaft 80. In this manner, the pins 94 transfer the linear movement of the outer shaft 82 to rotational movement of the inner shaft 80. For example, when the outer shaft 82 is translated upwards by the first and second pistons 62 and 64 as the actuator 16 is actuated into the open position (shown in FIG. 3), the pins 94 may slight along slots 96 to drive rotation of the inner shaft 80 in a first rotational direction. This first rotational movement may be transferred to the position shaft 86 via the gear box 84, as discussed below, and the position shaft 86 may drive a visual position indicator or gauge (e.g., a pointer or needle) 100 of the gear box 84 to a position indicating that the actuator 16 and the ball valve 20 is in an open position. Similarly, when the outer shaft 82 is translated downwards by the first and second pistons 62 and 64 as the actuator 16 is actuated into the closed position (shown in FIG. 2), the pins 94 may slide along slots 96 to drive rotation of the inner shaft 80 in a second rotational direction (e.g., opposite the first rotational direction). This second rotational movement may be transferred to the position shaft 86 via the gear box 84, and the position shaft 86 may drive the visual position indicator 100 of the gear box 84 to a position indicating that the actuator 16 and the ball valve 20 is in a closed position. Furthermore, during actuation of the actuator 16, the pins 94 sliding within the helical slots 96 of the inner shaft 80 may enable the linear movement of the outer shaft 82 to be continuously translated into rotational movement of the position shaft 86. As a result, the rotary position indicator 32 may provide continuous feedback indicating the instantaneous position of the actuator 16 and the ball valve 20.

In certain embodiments, the components of the actuator 16 and the rotary position indicator 32 may be formed from various materials. For example, the inner and outer shafts 80 and 82 may be formed from a metal, such as steel or aluminum. Furthermore, the features and components described above may be susceptible to modifications or variations. For example, the contour of the helical slots 96 may be selected based on a stroke distance of the actuator 16, which may further depend on the type of actuator 16 having the rotary position indicator 32. Moreover, the actuator 16 and rotary position indicator 32 may include other features to enable and/or improve operation of the rotary position indicator 32 and the actuator 16. For example, as shown in FIGS. 2 and 3, the outer shaft 82 includes various seals 102 disposed about the outer shaft 82 and the intermediate flange 54, the first piston 62, and the second piston 64. As will be appreciated, the seals 102 may be O-rings or other suitable seals that may block hydraulic fluid and/or air from leaking across the intermediate flange 54, the first piston 62, and the second piston 64 where the outer shaft 82 extends through.

Figure 4:
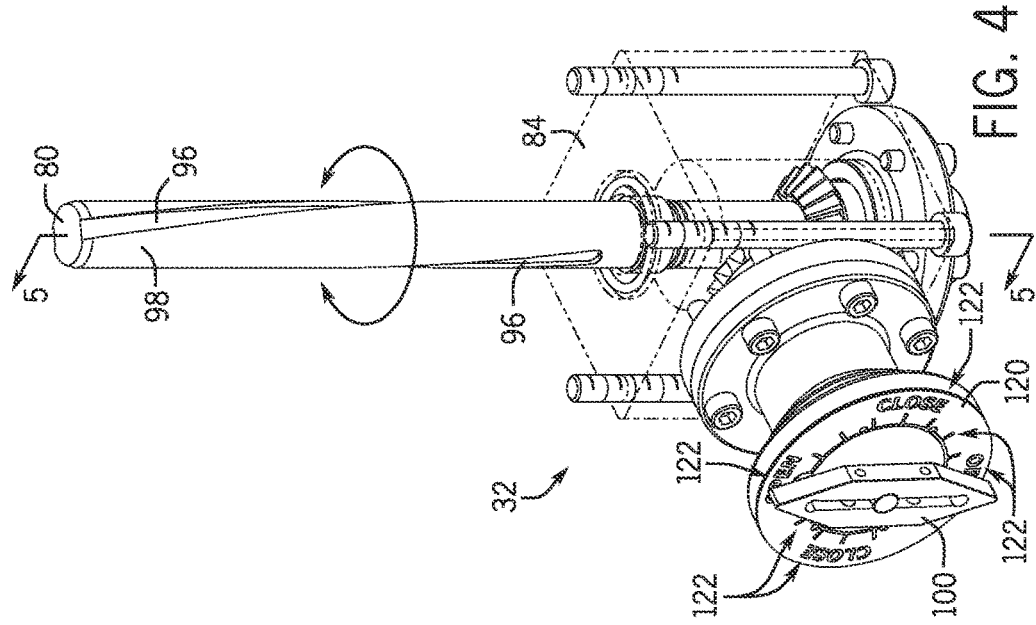
FIG. 4 is a perspective view of the rotary position indicator, in accordance with embodiments of the present disclosure.

FIG. 4 is a partial perspective view of an embodiment of the rotary position indicator 32, illustrating the inner shaft 80 and the gear box 84 of the rotary position indicator 32. As discussed above, the outer surface 98 of the inner shaft 80 includes spiraling or helical slots 96 that engage with pins 94 of the outer shaft 82 to transfer linear motion of the outer shaft 82 to rotational motion in the inner shaft 80. However, in other embodiments the outer shaft 82 and the inner shaft 80 may engage with some other spiraling interface, such as threads, other male/female connection, etc., to enable a transfer of linear motion to rotational motions. The rotational motion of the inner shaft 80 is transferred to the position shaft 86 of the rotary position indicator 32 by the gear box 84. The operation of the gear box 84 is discussed in further detail below with reference to FIG. 5.

As mentioned above, the position shaft 86 of the gear box 84 is coupled to the visual position indicator 100 (e.g., a gauge), which may be a pointer, needle, or other indicator that may rotate or otherwise change position when the position shaft 86 rotates. In the illustrated embodiment, the rotary position indicator 32 also includes a dial 120 with graphical indicators 122 that indicate a scaled position of the actuator 16 and/or ball valve 20. For example, the graphical indicators 122 include textual indicators, such as "open" and "close." As shown, the visual position indicator 100 is pointing toward the "open" graphical indicator 122 to indicate that the actuator 16 and/or ball valve 20 is in a fully open position. The graphical indicators 122 further includes notches disposed between the graphical indicators 122 "open" and "close" along a rotational path of the visual position indicator 100. As will be appreciated, the notch graphical indicators 122 may indicate a position of the actuator 16 and/or ball valve 20 between fully opened and closed positions. For example, each notch may represent a certain percentage, e.g., 5, 10, 15, 20, or 25% of distance between the open position and closed position. In other embodiments, the graphical indicators 122 on the dial 120 may include other markings or indicators, such as numerals, colors, and so forth.

Figure 5:
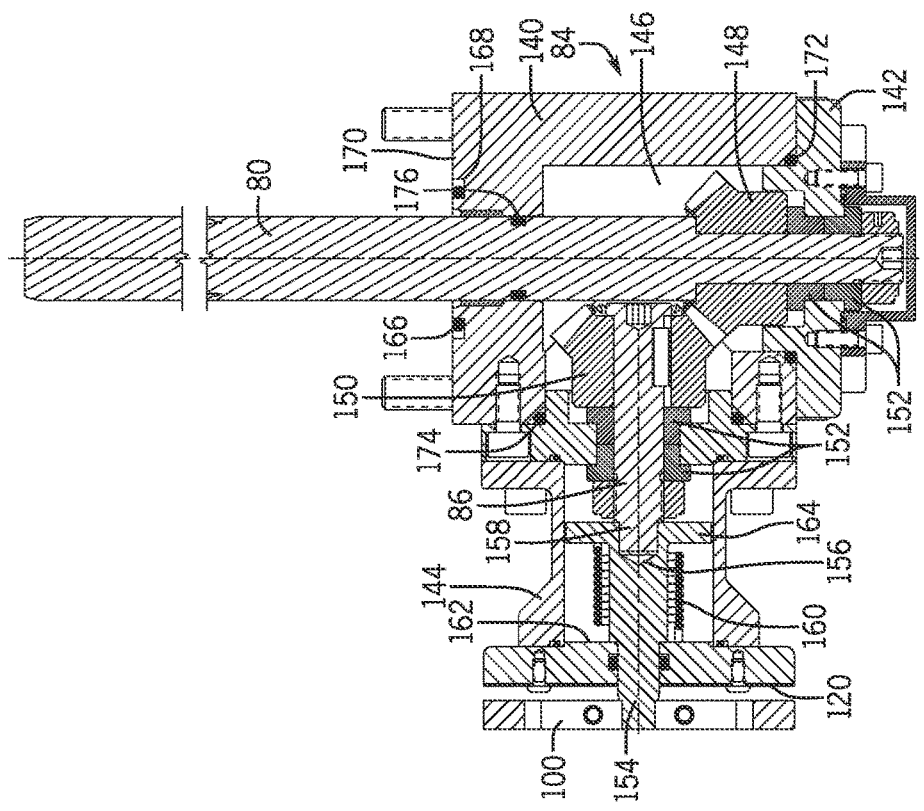
FIG. 5 is a cross-sectional side view, taken along line 5-5 of FIG. 4, of the rotary position indicator, in accordance with embodiments of the present disclosure.

FIG. 5 is a partial cross-sectional side view of an embodiment of the rotary position indicator 32, taken within line 5-5 of FIG. 4, illustrating the gear box 84 and its components. In the illustrated embodiment, the gear box 84 is formed by a frame 140, a base flange 142, and a side flange 144, which cooperatively form an interior volume 146 of the gear box 84. These components of the gear box 84 enclose moving components of the gear box 84 to reduce the number external moving components of the rotary position indicator 32.

Within the interior volume 146 is a first meter gear 148 and a second meter gear 150, which are geared with one another and disposed at a 90 degree angle relative to one another. The first meter gear 148 is coupled to the inner shaft 80, and the second meter gear 150 is coupled to the position shaft 86. Through engagement of the first and second meter gears 148 and 150, rotation of the inner shaft 80 is transferred (e.g., at a 90 degree angle) into rotation of the position shaft 86. The gear box 84 also has other components to enable smooth operation of the gear box 84, such as bushings 152 disposed between the gear box 84 frame components (e.g., the base flange 142 and the side flange 144) and the inner shaft 80 and the position shaft 86.

As shown, the position shaft 86 is further coupled to a spring shaft position indicator 154, which is further coupled to the visual position indicator 100. The spring shaft position indicator 154 includes a recess 156 that receives an axial end 158 of the position shaft 86. To enable a transfer of rotational movement between the position shaft 86 and the spring shaft position indicator 154, the recess 156 and the axial end 158 may have matching or complimentary geometries to enable congruent or consistent rotational motion between the position shaft 86 and the spring shaft position indicator 154.

The gear box 84 further includes a spring 160 disposed about the spring shaft position indicator 154. The spring 160 is configured to "pre-load" the spring shaft position indicator 154, such that rotation of the spring shaft position indicator 154 will be congruent and/or proportional to rotation of the position shaft 86. In other words, during assembly of the gear box 84, the spring 160 may be a torsion force or rotational spring force may be loaded into the spring 160 as the spring 160 is disposed about the spring shaft position indicator 154 and secured within the gear box 84. Specifically, the spring 160 is fixed in torsion between a side face 162 of the side flange 144 and a flange 164 of the spring shaft position indicator 154. The pre-loading of the spring 160 enables a reduction in undesired rotation (e.g., "backlash") of the spring shaft position indicator 154, such as rotation of the spring shaft position indicator 154 when the position shaft 86 is not rotating. As a result, the rotation of the spring shaft position indicator 154, and thus the position of the visual position indicator 100, may accurately reflect rotation of the position shaft 86 and the inner shaft 80. In other words, the position of the visual position indicator 100 may accurately reflect movement of the first and second pistons 62 and 64, and thus the position of the actuator 16 and ball valve 20.

Furthermore, the gear box 84 includes various seals (e.g., O-rings) positioned between the various components of the gear box 84. For example, a first seal 166 (e.g., annular seal or O-ring) is positioned in a recess 168 formed in a top surface 170 of the frame 140. As will be appreciated, the first seal 166 is configured to provide a sealing interface between the frame 140 and the cylinder end flange 50 of the actuator 16. The gear box 84 similarly includes a second seal 172 (e.g., annular seal or O-ring) positioned between the frame 140 and the base flange 142 to provide another sealing interface. For example, the second seal 172 may block fluid communication between the interior volume 146 of the gear box 84 and an external environment. A third seal 174 (e.g., annular seal or O-ring), similar to the second seal 172, is positioned between the frame 140 and the side flange 144 to block fluid communication between the interior volume 146 of the gear box 84 and an external environment. Furthermore, a fourth seal 176 (e.g., annular seal or O-ring) is positioned between the frame 140 and the inner shaft 80 to also block fluid communication between the interior volume 146 of the gear box 84 and an external environment. As a result, the second, third, and fourth seals 172, 174, and 176 may block oil or other lubricant from exiting the interior volume 146 of the gear box 84 and/or block contaminants or other debris from entering the interior volume 146 of the gear box 84. For example, the second, third, and fourth seals 172, 174, and 176 and/or other seals may create a hermetically sealed housing or gear box 84.

Figure 6:
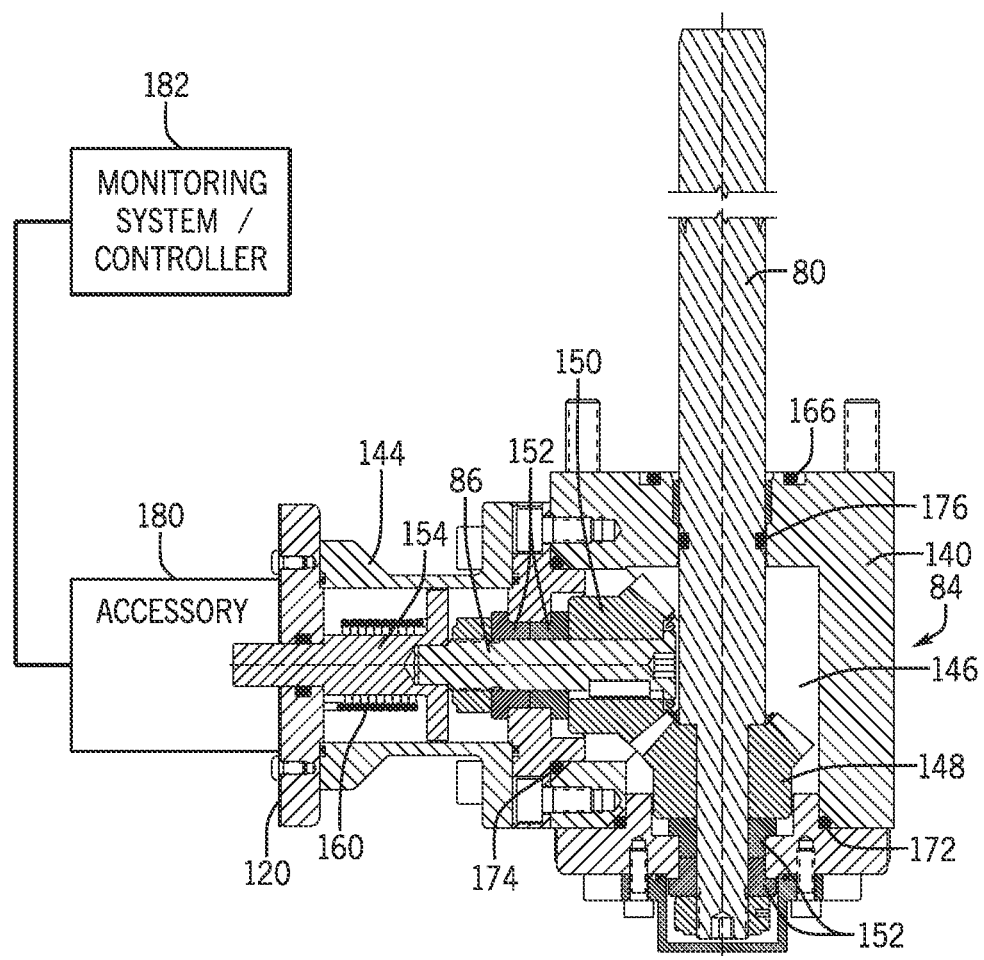
FIG. 6 is a cross-sectional side view, taken along line 5-5 of FIG. 4, of the rotary position indicator, in accordance with embodiments of the present disclosure.

FIG. 6 is a partial cross-sectional side view of an embodiment of the rotary position indicator 32, taken within line 5-5 of FIG. 4, the gear box 84 having a position indicator accessory 180. The position indicator accessory 180 is configured to measure rotation of the spring shaft position indicator 154 (e.g., with a high degree of accuracy). In certain embodiments, the position indicator accessory 180 may be a third party accessory or other accessory configured to attach to the side flange 144 over the spring shaft position indicator 154 via a mechanical coupling (e.g., bolts, screws, latches, etc.), adhesive, magnet, or other attachment.

For example, the position indicator accessory 180 may be a limit switch, a rotary encoder, a Hall effect sensor, an optical position sensor, or other position sensor configured to measure an angular position of the spring shaft position indicator 154 (e.g., with a high degree of accuracy). As the spring shaft position indicator 154 is configured to move congruently and/or proportionally with the position shaft 86 (e.g., via the spring 160), accurate measurement of the position of the spring shaft position indicator 154 may accurate reflect the precise position of the actuator 16 and/or the ball valve 20. As a result, the rotary position indicator 32 may enable a user or operator to modify or fine tune the position of the actuator 16 and/or ball valve 20, as desired. Furthermore, in certain embodiments, the position indicator accessory 180 may be coupled to a monitoring system and/or controller 182. For example, the monitoring system and/or controller 182 may monitor data or feedback from position indicator accessory 180 regarding the position of the spring shaft position indicator 154, and therefore the position of the actuator 16 and/or ball valve 20. In certain embodiments, the monitoring system and/or controller 182 may further regulate operation of the actuator 16 based on the feedback obtained from the position indicator accessory 180 (e.g., to obtain a desired position of the ball valve 20 and/or actuator 16).

As discussed in detail above, the present embodiments are directed to the rotary position indicator 32 for the actuator 16, such as a linear valve actuator. More specifically, the disclosed embodiments include the rotary position indicator 32 configured to provide a visual indication of a valve, such as the ball valve 20, actuated by the actuator 16. For example, the actuator 16 may be a cylinder actuator, a spring actuator, a hydraulic actuator, a pneumatic actuator, a motorized actuator, other type of actuator, or any combination thereof configured to actuate a valve, such as the ball valve 20, gate valve, plug valve, butterfly valve, or other type of valve. As the actuator 16 actuates the valve 20, the rotary position indicator 32, which is engaged with the actuator 16, also actuates to provide an accurate indication of the position of the valve 20. For example, the rotary position indicator 32 may be configured to provide an indication that the valve 20 is in an open position, a closed position, or any position therebetween via a visual position indicator such as indicator 100. Furthermore, the rotary position indicator 32 may be fully enclosed and sealed within a housing (e.g., gear box 84) that is integrated with the actuator 16. As such, the disclosed embodiments may be robust and without external moving parts to improve accuracy and repeatability of operation.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a rotary position indicator configured to couple to a piston of an actuator, wherein the rotary position indicator comprises:
a first shaft and a second shaft in a nested arrangement, wherein the first shaft is configured to couple to the piston and the first and second shafts are configured to transfer linear motion of the piston of the actuator into a first rotational motion; and
a gear box configured to couple to the actuator, wherein the gear box is configured to transfer the first rotational motion to a second rotational motion of a position shaft.

2. The system of claim 1, wherein the second shaft is coupled to a frame of the actuator.

3. The system of claim 2, wherein the first shaft comprises a pin, the second shaft comprises a spiral slot, and the pin is disposed in the spiral slot.

4. The system of claim 1, wherein the gear box comprises a first meter gear coupled to the second shaft and a second meter gear coupled to the position shaft, wherein the first and second meter gears are geared with one another and are disposed crosswise relative to one another.

5. The system of claim 4, wherein the gear box comprises a spring shaft position indicator coupled to the position shaft, and a visual position indicator coupled to the spring shaft position indicator, wherein the visual position indicator is disposed external to the gear box and is configured to represent an amount of the second rotational motion.

6. The system of claim 5, wherein the gear box comprises a dial disposed on an outer surface of the gear box, the dial comprises at least one graphical indicator, the visual position indicator comprises a pointer configured to point to the at least one graphical indicator based on the second rotational motion.

7. The system of claim 5, comprising a spring disposed about the spring shaft position indicator within the gear box, wherein the spring is preloaded in torsion.

8. The system of claim 1, comprising at least one seal disposed between the gear box and the actuator.

9. The system of claim 1, comprising a position indicator accessory coupled to the gear box, wherein the position indicator accessory is configured to measure an angular position of the position shaft, wherein the position indicator accessory comprises a limit switch, an optical switch, a rotary encoder, a Hall effect sensor or any combination thereof.

10. The system of claim 1, comprising the actuator and a valve configured to be actuated by the actuator.

11. A method of monitoring a position of an actuator, comprising:
transferring linear motion of an actuating element of the actuator to a first rotational motion;
transferring the first rotational motion to a second rotational motion via a gear box coupled to an external surface of the actuator, wherein the second rotational motion is configured to adjust the position of a visual position indicator, and wherein transferring linear motion of the actuating element of the actuator to the first rotational motion comprises coupling an outer shaft of a nested shaft arrangement to a piston of the actuator, and extending a pin of the outer shaft into a spiral slot of an inner shaft of the nested shaft arrangement; and
measuring an angular position of a position shaft with a position indicator accessory.

12. The method of claim 11, wherein transferring the first rotational motion to the second rotational motion via the gear box coupled to the external surface of the actuator comprises gearing a first meter gear of the gear box coupled to the inner shaft with a second meter gear of the gear box coupled to a position shaft.

13. The method of claim 12, comprising transferring the second rotational motion from the position shaft to a spring shaft position indicator coupled to the visual position indicator.

14. The method of claim 13, comprising preloading a spring in torsion about the spring shaft position indicator and within the gear box.

15. A system, comprising:
a rotary position indicator configured to integrate with an actuator, wherein the rotary position indicator comprises:
a first shaft and a second shaft in a nested arrangement, wherein the first and second shafts are configured to transfer linear motion of an actuation component of the actuator into a first rotational motion; and
a gear box configured to couple to the actuator, wherein the gear box is configured to transfer the first rotational motion to a second rotational motion of a position shaft, and wherein the gear box comprises a first meter gear coupled to the second shaft and a second meter gear coupled to the position shaft, wherein the first and second meter gears are geared with one another and are disposed crosswise relative to one another.

* * * * *